(12) United States Patent
Li et al.

(10) Patent No.: US 10,678,768 B2
(45) Date of Patent: Jun. 9, 2020

(54) LOGICAL BAND-BASED KEY-VALUE STORAGE STRUCTURE

(71) Applicant: Intel Corporation, Santa Clara, CA (US)

(72) Inventors: Peng Li, Portland, OR (US); Sanjeev Trika, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 202 days.

(21) Appl. No.: 15/639,651

(22) Filed: Jun. 30, 2017

(65) Prior Publication Data

US 2019/0005079 A1  Jan. 3, 2019

(51) Int. Cl.
*G06F 16/22* (2019.01)
(52) U.S. Cl.
CPC .............. *G06F 16/2272* (2019.01)
(58) Field of Classification Search
None
See application file for complete search history.

(56) References Cited

U.S. PATENT DOCUMENTS

| | | | | |
|---|---|---|---|---|
| 5,396,468 A * | 3/1995 | Harari | ............ | G11C 16/10 365/185.01 |
| 6,222,762 B1 * | 4/2001 | Guterman | ............ | G11C 11/5621 257/E27.103 |
| 6,789,116 B1 * | 9/2004 | Sarkissian | ............ | H04L 29/06 370/235 |
| 2005/0141312 A1 * | 6/2005 | Sinclair | ............ | G06F 11/1072 365/222 |
| 2008/0091871 A1 * | 4/2008 | Bennett | ............ | G06F 12/0246 711/103 |
| 2008/0215849 A1 * | 9/2008 | Scott | ............ | G06F 16/9014 711/216 |
| 2008/0282045 A1 * | 11/2008 | Biswas | ............ | G06F 12/0246 711/159 |
| 2013/0046580 A1 * | 2/2013 | Harker | ............ | G06Q 10/00 705/7.31 |
| 2013/0318347 A1 * | 11/2013 | Moffat | ............ | H04L 63/08 713/168 |
| 2017/0102846 A1 * | 4/2017 | Ebler | ............ | A61M 1/3626 |
| 2017/0142082 A1 * | 5/2017 | Qian | ............ | G06F 21/62 |

OTHER PUBLICATIONS

Li et al, "Techniques to Manage Key-Value Storage at a Memory or Storage Device", Application No. 15/279,279 dated Sep. 28, 2016, 60 pages.
Lu et al., "WiscKey: Separating Keys from Values in SSD-conscious Storage", Proceedings of 14th USENIX Conference on File and Storage Technologies, Feb. 22, 2016, pp. 133-148, Santa Clara, California.

* cited by examiner

*Primary Examiner* — Wilson Lee
(74) *Attorney, Agent, or Firm* — Jordan IP Law, LLC (57) ABSTRACT

Systems, apparatuses and methods may store data. A system may include a processor communicatively coupled to an indexing structure and a datastore log separate from the indexing structure. The indexing structure may store key data corresponding to a key of a key-value pair and an address for the key-value pair. The datastore log may store the key-value pair at the address in a logical band of a plurality of independent logical bands. In addition, the system may include a memory device coupled to the processor. The memory device may include instructions, which when executed by the processor, may cause the system to execute an operation involving the key-value pair.

20 Claims, 7 Drawing Sheets

```
void DBImpl::Get(const Slice& key, std::string* value) {
    unsigned int                        hashEntryIndex;
    hashdb::hashTableEntry              hashEntryData;
    unsigned int                        lBandReadBandIndex;
    unsigned int                        lBandReadPosition;
    unsigned int                        lBandKvpReadLength;
    unsigned int                        lBandKeyReadLength;
    Slice                               lBandKeyRead;
    Slice                               lBandValueRead;
    hashdb::lBandEntryHeader            lBandEntryHeaderData;

// Get the hash table Entry index
    hashEntryIndex = calculateHashTableEntry(key);

// Load the hash table entry.
    loadHashTableEntry(hashTableFile, &hashEntryData);

// Get the band index & offset from node1
    lBandReadBandIndex = hashEntryData.node1.bandIndex;
    lBandReadPosition = lBandReadBandIndex * dbSysInfo.lBandSize + hashEntryData.node1.bandOffset;
    lBandKvpReadLength = hashEntryData.node1.kvLength;
    readKeyValueFromLBand(lBandReadPosition, lBandKvpReadLength, lBandKeyRead, lBandValueRead);

if (lBandKeyRead.compare(key) == 0) { // If the KEY matches.
        // Return the value
        value->assign(lBandValueRead.data());
    }
    else {
        // Search node 2.
        // If still not match, search the nodes in the linked list.
        // If none was found in the end, return not found status or an error.
    }
}
```

```
void DBImpl::Put(const Slice& key, const Slice& val) {
    unsigned int    lBandWritePosition;

if (!isCurrentLBandHasEnoughSpace(key, val)) {
        // Update the state of the LBand that will be closed.
        lBandStateInfo[dbSysInfo.curOpenLBand].isLBandClean = false;
        lBandStateInfo[dbSysInfo.curOpenLBand].isLBandClosed = true;
        lBandStateInfo[dbSysInfo.curOpenLBand].isLBandOpen = false;
        ClosedLBandLinkedList.push_back(dbSysInfo.curOpenLBand);

// Open a new clean LBand.
        dbSysInfo.curOpenLBand = CleanLBandLinkedList.front();
        CleanLBandLinkedList.pop_front();
        dbSysInfo.curOpenLBandOffset = 0;
        lBandStateInfo[dbSysInfo.curOpenLBand].isLBandClean = false;
        lBandStateInfo[dbSysInfo.curOpenLBand].isLBandClosed = false;
        lBandStateInfo[dbSysInfo.curOpenLBand].isLBandOpen = true;
        lBandStateInfo[dbSysInfo.curOpenLBand].lBandSeqNum = CurSeqNum;

lBandFile->SetPosition(dbSysInfo.curOpenLBand * dbSysInfo.lBandSize);

// Check if we need to do the defrag or not to open the new LBand
        if (CleanLBandLinkedList.size() <= 1) {
        // Trigger the defrag when the number of clean LBands is less than 1.
        defrag();
        }
    }

// Get the current LBand write position
    lBandWritePosition = dbSysInfo.curOpenLBand * dbSysInfo.lBandSize + dbSysInfo.curOpenLBandOffset;

// Write KVP to the LBand with the given write position.
    writeLBandEntry(lBandWritePosition, key, val);

// Update the Hash Table
    updateHashTableEntry(key, val);

// Update the System Information about the latest LBand Offset.
    dbSysInfo.curOpenLBandOffset += sizeof(hashdb::lBandEntryHeader) + key.size() + val.size();
}
```

```
void DBImpl::Delete(const Slice& key) {
    unsigned int    lBandWritePosition;

if (!isCurrentLBandHasEnoughSpace(key, DELETE_TOKEN)) {
        ... // The code here is the same as the one in Figure 3, PUT operation.
    }

// Get the current LBand write position
    lBandWritePosition = dbSysInfo.curOpenLBand * dbSysInfo.lBandSize + dbSysInfo.curOpenLBandOffset;

// Write delete token to the LBand with the given write position.
    writeLBandEntry(lBandWritePosition, key, DELETE_TOKEN);

// Update the Hash Table
    updateHashTableEntry(key, DELETE_TOKEN);

// Update the System Information about the latest LBand Offset.
    dbSysInfo.curOpenLBandOffset += sizeof(hashdb::lBandEntryHeader) + key.size() + size(DELETE_TOKEN)
}
```

```
void DBImpl::defrag(void) {
    // First of all, we need to select a target band from the closed LBand list.
    std::list<unsigned int>::iterator it;
    unsigned int maxInvalidity;
    unsigned int targetLBandIndex;
    it = ClosedLBandLinkedList.begin();
    targetLBandIndex = 0; // Initilized to LBand 0.
    maxInvalidity = 0;
    for (it = ClosedLBandLinkedList.begin(); it != ClosedLBandLinkedList.end(); it++) {
        if (maxInvalidity < LBandStateInfo[*it].NumInvalidBytes) {
            maxInvalidity = LBandStateInfo[*it].NumInvalidBytes;
            targetLBandIndex = *it;
        }
    }
    ClosedLBandLinkedList.remove(targetLBandIndex);

// Second, we need to relocate the valid KVP from the target LBand.
    unsigned int targetLBandOffset = 0;
    while (targetLBandOffset < dbSysInfo.LBandSize) { // Scan the entire target LBands.
        // Step 2.1 --- Read the KVP from the LBand
        unsigned int LBandReadPosition;
        unsigned int LBandReadLength;
        hashdb::LBandEntryHeader LBandHeader; // The header descriptor of the KVP.
        Slice curKey; // The KEY read from the target LBand
        Slice curValue; // The Value read from the target LBand
        LBandReadPosition = targetLBandIndex * dbSysInfo.LBandSize + targetLBandOffset;
        readKvpHeaderFromLBand(LBandReadPosition, LBandHeader);
        LBandReadLength = getLengthFromLBandHeader(LBandHeader);
        readKeyValueFromLBand(LBandReadPosition, LBandReadLength, curKey, curValue);

// Step 2.2 --- check if the KEY is still valid.
        unsigned int             hashEntryIndex;
        hashdb::hashTableEntry   hashEntryData;
        bool                     isValid;
        isValid = false;
        // Get the hash table index
        hashEntryIndex = calculateHashTableEntry(key);
        loadHashTableEntry(hashTableFile, &hashEntryData);

if (isKeyFoundInhashEntry(hashEntryData, targetLBandIndex, targetLBandOffset, curKey)) {
            isValid = true;
        }

// Step 2.3 --- Relocate if valid.
        if (isValid) {
            defragPut(curKey, curValue);
        }

// Step 2.4 --- Update the target LBand read offset.
        targetLBandOffset += LBandReadLength;
    }

// Third, we need to update the LBandStateInfo, dbSysInfo, and update the defragged LBand.
    LBandStateInfo[targetLBandIndex].isLBandClean = true;
    LBandStateInfo[targetLBandIndex].isLBandClosed = false;
    LBandStateInfo[targetLBandIndex].isLBandOpen = false;
    LBandStateInfo[targetLBandIndex].NumInvalidBytes = 0;  // Now it's clean.
    CleanLBandLinkedList.push_back(targetLBandIndex);
}
```

LOGICAL BAND-BASED KEY-VALUE STORAGE STRUCTURE

TECHNICAL FIELD

Embodiments generally relate to a memory structure. More particularly, embodiments relate to a key-value storage structure based on logical bands.

BACKGROUND

Non-volatile memory (NVM) may be used to persistently store data in a solid state drive (SSD). Indeed, SSDs that include NVM such as Intel® (a registered trademark of Intel Corporation in the U.S. and/or other countries) data center SSDs may have performance advantages over conventional storage drives including running demanding workloads simultaneously, lowering costs, increasing system utilization for greater responsiveness and faster time to market, and so on. Meanwhile, conventional key-value/object-storage systems such as databases or file-systems may be implemented to store, retrieve, and manage associative arrays in various modern data-intensive applications such as web indexing, e-commerce, photo stores, cloud data, social networking, online gaming, messaging, and so on. Key-value pairs may, however, be incorporated into an indexing structure and therefore may lead to inefficiencies with regard to write amplification, read amplifications, wear, garbage collection, and so on. Moreover, data of a key-value pair may be tied to one indexing structure and therefore may limit system flexibility. Additionally, there is substantial room for improvement to minimize inefficiencies from conventional data storage structures to realize the potential of memory structures such as NVM used in SSDs.

BRIEF DESCRIPTION OF THE DRAWINGS

The various advantages of the embodiments will become apparent to one skilled in the art by reading the following specification and appended claims, and by referencing the following drawings, in which:

FIG. 4 is an example of a listing to execute an insertion operation according to an embodiment;

FIG. 5 is an example of a listing to execute a deletion operation according to an embodiment;

FIG. 6 is an example of a listing to execute a garbage collection operation according to an embodiment;

DESCRIPTION OF EMBODIMENTS

Figure 1:
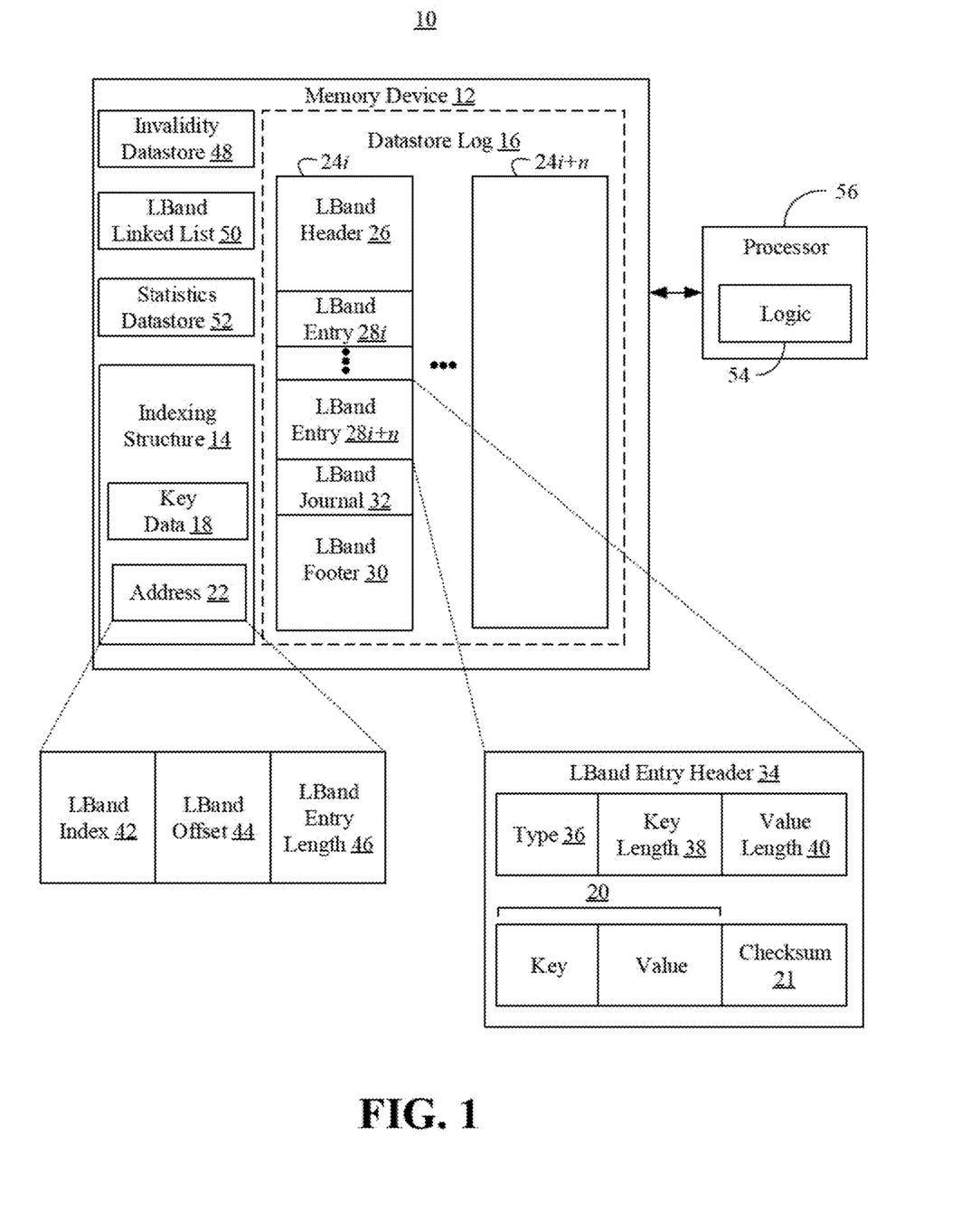
FIG. 1 is a block diagram of an example of a storage system according to an embodiment.

Turning now to FIG. 1, a storage system 10 is shown according to an embodiment in which a memory device 12 may store an indexing structure 14 and a datastore log 16. The memory device 12 may include, for example, a solid state drive (SSD) that includes non-volatile memory (NVM), a dual in-line memory module that includes NVM, and so on. In the illustrated example, the indexing structure 14 and the datastore log 16 are separate data storage structures that store different data for efficient operations. For example, the indexing structure 14 stores key data 18 corresponding to a key of a key-value pair 20 and an address 22 for the key-value pair 20 corresponding to the physical location of the key-value pair 20 stored in the datastore log 16. Notably, the datastore log 16 is interoperable with many types of indexing structures including tree-based indexing structures, hash-based indexing structures, etc., which offers flexibility for implementing efficient operations in data-intensive applications. Indeed, faster indexing solutions may be leveraged using the datastore log 16.

The indexing structure 14 may include, for example, a B tree, a B plus tree, a log structured merge (LSM) tree, a hash table, etc., wherein the key data 18 may include a copy of the key in the key-value pair 20 (e.g., a tree, etc.), a hash value of the key in the key-value pair 20 (e.g., a hash table, etc.), and so on. The indexing structure 14 may, therefore, include nodes that maintain data corresponding to keys in a sorted order and/or that point to locations of key-value pairs in the datastore log 16. Moreover, the absence of values from the indexing structure 14 and/or the presence of key-value pairs in the datastore log 16 may provide efficiencies in write amplification (WA), read amplification (RA), and so on. For example, an improvement of six times the write performance for random put workloads (e.g., 4.3 amplification ratio) and one-hundred-and-fifty times the read performance (e.g., 2.0 amplification ratio) may be achieved (1 TB database size) compared to structures such as LevelDB. The improvements in WA and/or RA may, in turn, directly improve system performance, system endurance, system cost, and so on.

In the illustrated example, the datastore log 16 includes a plurality of independent logical bands (LBands) 24 ($24_i$-$24_{i+n}$). Notably, the logical bands 24 are separate data structures, autonomous data structures, and/or do not depend on one another for operation. The datastore log 16 (e.g., an entire logical storage space) may be divided into the logical bands 24 using a file system, logical block addressing (LBAs), storage device physical bands, etc. In one example, the logical bands 24 may be mapped using files with a fixed size to represent each logical band or mapped to a fixed range with a file. In another example, the logical bands 24 may be mapped using LBAs by mapping each logical band to a range of logical block addresses. In a further example, the logical bands 24 may be mapped using storage device physical bands by mapping each logical band to physical bands of a storage device directly (e.g., physical sectors).

Accordingly, the datastore log 16 may be written in sections to independent logical bands 24 rather than one large stream. As a result, the datastore log 16 may allow for efficiencies in defragmentation (e.g., remove invalidity, reclaim storage space from invalid data, etc.) of logical bands since, for example, key-value pairs may be relocated from a most invalid logical band rather than relocation in an inflexible first-in-first out (FIFO) manner from large single streams. As discussed below, wear-leveling may also be considered to provide efficiencies. Thus, improvements in defragmentation efficiencies may directly improve system performance, endurance, cost, and so on.

In the illustrated example, the logical bands 24 each accommodate a plurality of independent data structures. For example, the logical band $24_i$ includes a logical band header 26, logical band entries 28 ($28_i$-$28_{i+n}$), a logical band footer 30, and a logical band journal 32. The logical band header 26 may be populated with logical band metadata such as a sequence number unique for the logical band $24_i$. In one example, the sequence number is appended to the logical band header 26 when the logical band $24_i$ is opened, and is deleted when the logical band $24_i$ is erased (e.g., defragged). The sequence number may, for example, include a 64-bit number from a substantially large address space that might not be fully consumed (e.g., $0$-$2^{64}$). If consumed, however, the storage system 10 may simply revert back to using the first sequence number. Moreover, the logical band footer 30 may be populated with metadata such as an error code (e.g., checksum, etc.) for the logical band $24_i$ when the logical band $24_i$ is closed. As will be discussed below, the logical band journal 32 may also be populated with each hash table entry in a hash table to accelerate defragmentation.

The logical band entries 28 may further be populated with data for a logical band entry header 34. For example, the logical band entry $28_{i+n}$ includes a type field 36 that may have a fixed length, a key length field 38 that may have a fixed length, a value length field 40 that may have a fixed length, and the key-value pair 20 (e.g., a variable-sized key and/or value). The type field 36 may, for example, be populated with data to characterize the payload contents (e.g., Type=enum {KV, Token, Pad}). For example, the type field 36 may be populated with "KV" to indicate the payload is a key-value pair. The type field 36 may also be populated with "Token" to indicate the payload is a delete token. In this regard, the delete token may be similar to a value of a key-value pair.

The type field 36 may further be populated with "Pad" to indicate that payload includes padding bits since the logical band $24_i$ may have a fixed length but the logical band entries 28 may have variable lengths owing to the variable sizes of key-value pairs. Notably, the datastore log 16 improves upon systems where physical bands inside storage devices are implemented since variable-sized data can be accommodated in the logical band entries 28 (e.g., do not require sector-aligned data). In the illustrated example, the key length field 38 may be populated with the length of the key in the key-value pair 20, and the value length field 40 may be populated with the length of the value in the key-value pair 20. Moreover, a fixed-length checksum 21 may be appended to the key-value pair 20 to provide error detection/correction for the key-value pair 20.

Accordingly, the address 22 may correspond to the key in the key-value pair 20. In the illustrated example, the address 22 includes a logical band index 42 to the logical band $24_i$, a logical band offset 44 to the logical band entry $28_{i+n}$, and a logical band entry length 46 for the logical band entry $28_{i+n}$. In one example, the logical band index 42 may be a file name when the logical band $24_i$ is represented by a single file that has a fixed size (e.g., file 1=LBand $24_i$ file 2=LBand $24_{i+1}$, etc.). The logical band index 42 may also be portions of a single file when the datastore log 16 is represented by a single file that has a fixed size (e.g., 100 LBands in 1 Tb file, LBand $24_i$=first 10 GB, LBand $24_{i+1}$=second 10 GB, etc.). In another example, the logical band index 42 may be a LBA range when the logical band $24_i$ is represented by an LBA (e.g., LBand=LBA 1000-1999, LBand $24_{i+1}$=LBA 2000-2999, etc.). The logical band index 42 may also be a sector when the logical band $24_i$ is represented by a physical band of a storage device (e.g., LBand $24_i$=0 to X sectors, LBand=offset X+1 to 2X, etc.).

When the logical bands 24 accommodate variable-sized key-value pairs, the logical band offset 44 may provide a start location of the logical band entry $28_{i+n}$. Thus, the logical band offset 44 may be an offset from the start of the logical band $24_i$ provided by the logical band index 42. In addition, the logical band entry length 46 may provide the entire length of the logical band entry $28_{i+n}$. In one example, the type field 36, the key length field 38, the value length field 40, and the checksum 21 are of fixed length. Thus, the logical band entry length 46 may be used to determine a location where to perform an operation for the key-value pair 20 while the key length in the key length field 38 and the value length in the value length field 40 provides how much data is involved.

The storage system 10 may further keep one or more data structures in host memory (e.g., system memory, etc.) during runtime and flush to a storage device periodically, flush when a particular logical band 24 is closed, flush when the datastore log 16 is closed, and so on. For example, an invalidity datastore 48 may include a table (e.g., one-dimensional array) that contains an invalidity count (e.g., a number of invalid bytes per logical band). In this regard, a number of entries may be same as a number of logical bands 24 (e.g., one entry per logical band). Moreover, a count of invalid bytes per logical band may provide how much invalid data is present for a particular logical band.

Initially, all elements in the invalidity datastore 48 may be set to zero (e.g., assume all logical bands are valid). After each PUT or DELETE operation, for example, there may be a stale copy of a key-value pair in the datastore log 16. For example, an overwrite or a deletion of a key-value pair may cause the key-value pair to become invalid and/or stale and trigger an update to the invalidity datastore 48. In this regard, the storage system 10 may locate an address of that existing key-value pair and read the length of the key-value pair to update the corresponding entry in the invalidity datastore 48 with the length. The invalidity count in the invalidity datastore 48 may be used, alone or in combination with an erase count, to select a logical band for defragmentation.

The memory device 12 further includes a logical band linked list 50, which may operate as a repository for clean logical bands and/or closed logical bands. A clean logical band may refer to a logical band that has been defragged (e.g., erased, reclaimed, etc.) and/or a logical band that has never been used. A closed logical band may refer to a logical band that is used and closed to prevent the addition of more data. The closed band may be a fully or a partially occupied logical band. Thus, the logical band linked list 50 may be used to find a new logical band that needs to be opened to write new (or defragged) key-value pairs. Moreover, an erased logical band may be placed back in the logical band linked list 50 for re-use. Additionally, when a currently open logical band is full (or cannot accommodate more data such as key-value pair) the currently open logical band may be closed and placed back into the logical band linked list 50.

The memory device 12 further includes a statistics datastore 52 to store data for the storage system 10. The statistics datastore 52 may include information such as current available free space in the datastore log 16, an amount of data that has been written to a device such as the memory device 12, an amount of data that has been written by a host, read amplification, write amplification, and so on. Moreover, the statistics datastore 52 may include read cycles for each logical band 24 (e.g., LBand $24_i$ read n number of times, etc.) and release information (e.g., LBand $24_i$ released n number of times during defrag, etc.). The information from the statistics datastore 52 may be utilized to balance invalidity and band routing, as well as to understand workload. Additionally, the invalidity datastore 48 and/or the statistics datastore 52 may include an erase count for the logical bands 24 when, for example, logical bands are directly mapped to storage device physical bands and the erase count is to be tracked.

The storage system 10 further includes logic 54 (e.g., application specific integrated circuit/ASIC, complementary metal oxide semiconductor/CMOS, transistor-transistor logic/TTL, and/or other fixed functionality technology) to execute an operation involving the key-value pair when a command is issued by a host. The memory device 12 may also store instructions, which when executed by the processor 56 (e.g., embedded processor, controller, etc.), cause the processor 56 to perform an insertion (e.g., addition, overwrite, etc.), a point lookup, a range query, a deletion, a snapshot, defragmentation, recovery, and so on. Thus, the logic 54 and/or the processor 56 may implement any of the herein mentioned technologies involving, for example, the memory device 12, the key indexing structure 14, the datastore log 16, the invalidity datastore 48, the logical band linked list 50, the statistics datastore 52, and so on.

In one example, the memory device 12 may include NVM to store the indexing structure (e.g., three dimensional crosspoint memory device (3DXP), etc.) and NVM to store the datastore log 16 including keys and values (e.g., NAND flash, 3DXP, etc.). One or more data structures may also be kept on the memory device 12 and write-back cached in host memory (e.g., dynamic random access memory (DRAM), etc.). Moreover, during runtime for example, data structure information may be flushed from host memory to the memory device 12. Thus, for example, a tree-based indexing structure (e.g., LSM tree, etc.) and/or portions thereof may be cached in system memory.

The logic 54 and/or the processor 56 may, therefore, receive key-value commands from a host (e.g., using a key-value application programming interface (API) over a communication protocol via an I/O interface), and utilize the information stored, e.g., in the memory device 12 to execute operations for the commands. The host (e.g., a central processing unit, etc.) may, for example, utilize a communication protocol to communicate with the logic 54 and/or the processor 56 such as Peripheral Component Interconnect (PCI) Express (e.g., Base Specification, revision 3. la, published in December 2015), a communication protocol according to one or more Ethernet standards promulgated by the Institute of Electrical and Electronics Engineers (IEEE) (e.g., IEEE 802.3-2012, Carrier sense Multiple access with Collision Detection (CSMA/CD) Access Method and Physical Layer Specifications, Published in December 2012), etc., may utilize an I/O interface arranged to use memory or storage access technologies including NVM Express (NVMe) (e.g., Specification, revision 1.2a, published in October 2015), Serial Attached SCSI (SAS) (e.g., Specification, revision 3.0, published in November 2013), etc., may utilize protocol extensions such as NVMe over Fibre Channel ("NVMf"), the simple storage service ("S3"), Swift or Kinetic protocol extensions, etc., and so on.

While examples have provided various components of the storage system 10 for illustration purposes, it should be understood that one or more components of the storage system 10 may reside in the same and/or different physical and/or virtual locations, may be combined, omitted, bypassed, re-arranged, and/or be utilized in any order. Moreover, any or all components of the storage system 10 may be automatically implemented (e.g., without human intervention, etc.).

Figure 2:
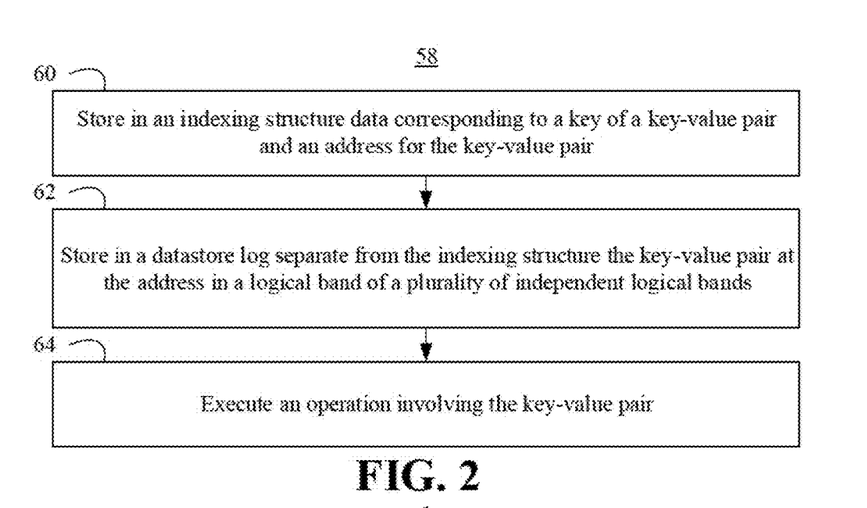
FIG. 2 is a flowchart of an example of a method to operate a storage system according to an embodiment.

FIG. 2 shows a method 58 to operate a storage system according to an embodiment. The method 58 may generally be implemented in logic such as, for example, the logic 54 (FIG. 1), already discussed. The method 54 may be implemented as a set of logic instructions stored in a machine- or computer-readable storage medium such as random access memory (RAM), read only memory (ROM), programmable ROM (PROM), firmware, flash memory, 3DXP memory, etc., in configurable logic such as, for example, programmable logic arrays (PLAs), field programmable gate arrays (FPGAs), complex programmable logic devices (CPLDs), or any combination thereof.

For example, computer program code to carry out operations shown in the method 58 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 60 provides for storing data corresponding to a key of a key-value pair and an address for the key-value pair in an indexing structure. Block 60 may, for example, store the key data and the address at a node of a tree-based indexing structure, a node of a hash-based indexing structure, and so on. For example, block 60 may utilize a B tree, a B plus tree, an LSM tree, a hash table, etc., wherein a node of the indexing structure may store a copy of a key, a hash value for a key, and so on. In addition, the node of the indexing structure may store an address that includes a logical band index, a logical band offset, and/or a logical band entry length.

Block 60 may, for example, insert a current address for the key-value pair at the indexing structure. For example, when a key-value pair is overwritten to a new logical band entry of a logical band, block 60 may insert a current address for the key-value pair that includes a current logical band index to the logical band, a current logical band offset to the current logical band entry, and a current logical band entry length of the current logical band entry. When a key-value pair is deleted, block 60 may insert a null address that indicates the key-value pair has been deleted (e.g., there is a delete token in the logical band entry). In this regard, the null address may not point to any location in a datastore log and may be released for re-use (e.g., after defragmentation).

Illustrated processing block 62 provides for storing the key-value pair at the address in a logical band of a plurality of independent logical bands. The independent logical bands are in a datastore log that is separate from the indexing structure. In addition, each logical band of the plurality may be structured to accommodate two or more independent logical band entries that are to store a respective key-value pair. Thus, block 62 may utilize a plurality of logical bands that each includes one or more independent data structures. Each logical band may include a logical band header, a logical band entry, and a logical band footer. Additionally, a logical band may include a logical band journal based on the indexing structure that is used (e.g., a hash table, etc.).

Block 62 may, for example, map the datastore log to a file system, logical block addressing, or storage device physical bands to divide the datastore log into the plurality of independent logical bands. In addition, block 62 may populate each logical band of the plurality with data for a logical band header, a logical band entry, a logical band footer, and/or a logical band journal. For example, block 62 may populate a logical band header with a sequence number. Block 62 may also populate a logical band entry with data for a logical band entry header. In one example, a logical band entry header may include a type field, a key length field, a value length field, a key-value pair, and/or an error detection code for the key-value pair. Additionally, block 62 may populate the footer with an error detection code for a logical band. Block 62 may further populate the logical band journal with a hash table entry (e.g., when the indexing structure is a hash table).

Illustrated processing block 64 provides for executing an operation involving the key-value pair. The operation may include, for example, an insertion (e.g., addition, overwrite, etc.), a point lookup, a range query, a deletion, a snapshot, defragmentation, recovery, and so on. For example, block 64 may determine that the indexing structure is a tree-based structure and may locate a copy of a key for a command involving the key (e.g., a read request for the key, etc.). In one example, block 64 may compare an incoming key (input key) to a key in a root of a B+ tree. If the input key is smaller than the key in the root, block 64 may move to the left of the B+ tree until a match is found. Block 64 may then read an address in a node of the B+ tree corresponding to the key-value pair in the datastore log (e.g., in a logical band entry) and complete the operation (e.g., return a valid value corresponding to a valid key-value pair for a read, etc.).

Figure 3:
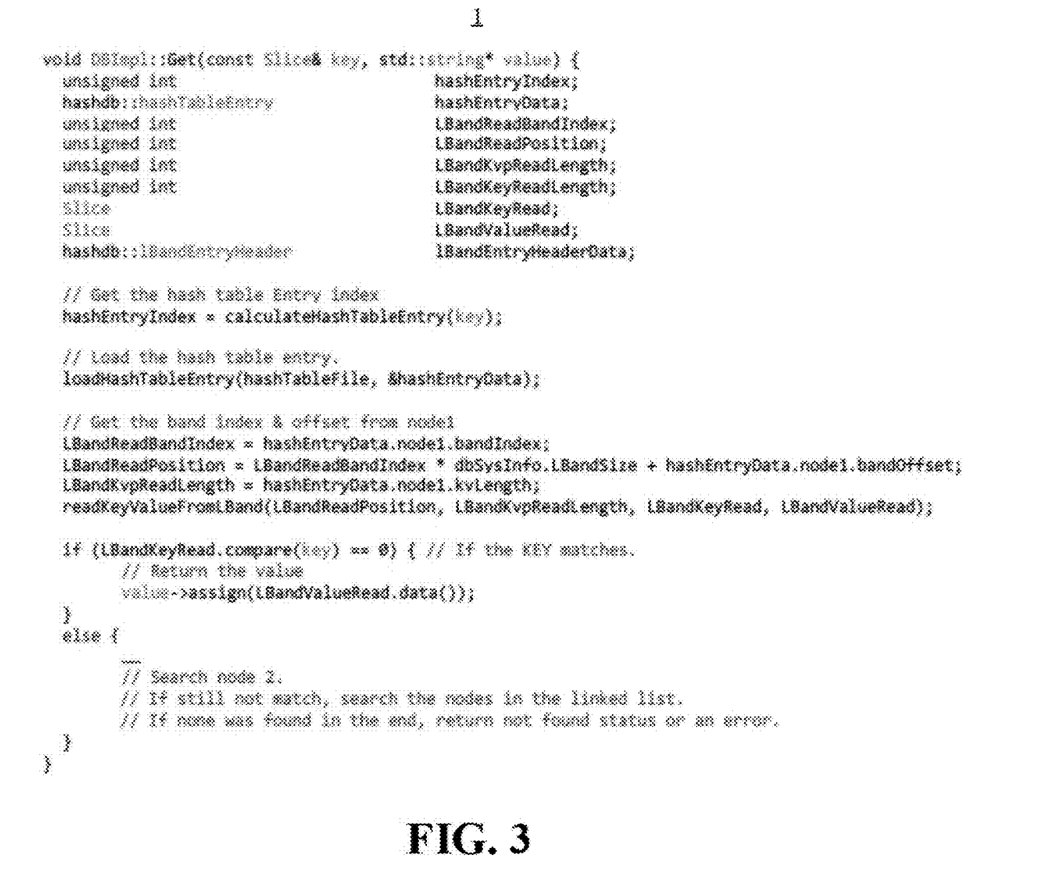
FIG. 3 is an example of a listing to execute a read operation according to an embodiment.

Block 64 may further determine that the indexing structure is a hash table. In this regard, block 64 may execute a read operation 1 in response to a read command (e.g., Get(Key)) as shown in FIG. 3, an insertion operation 2 in response to an insertion command (e.g., Put(Key, Value)) as shown in FIG. 4, a delete operation 3 in response to a delete command (e.g., Delete(Key)) as shown in FIG. 5, a defragmentation operation 4 in response to a trigger (e.g., defrag) as shown in FIG. 6, and so on.

Returning back to FIG. 2, block 64 may also update an invalidity datastore with an invalidity count (e.g., number of invalid bytes per logical band, etc.) and/or an erase count. Block 64 may also update a logical band linked list with a clean logical band and/or with a closed logical band. Moreover, block 64 may obtain a next clean logical band when needed. Block 64 may also update statistic information in a statistics datastore for a storage system. Block 64 may further update an invalidity datastore and/or a statistics datastore with an erase count for a logical band. Block 64 may further select a target logical band based on an invalidity count and/or an erase count, and relocate all valid key-value pairs from the target logical band to a current logical band and erase the target logical band. The erased target logical band may be stored in the linked list and re-used as needed.

Block 64 may further recover a logical band, indexing structure invalidity datastore, logical band linked list, and/or statistics datastore. Recovery may involve obtaining a particular data structure from storage and/or rebuilding the particular data structure. For example, block 64 may read each logical band after a failure. Some of the logical bands may be clean (e.g., erased, never used, etc.) and some may have data (e.g., a key-value pair, etc.). The clean logical bands have no sequence numbers or a sequence number of zero. Moreover, the logical band with the highest sequence number may be identified as the last open logical band when failure occurred. Thus, block 64 may order the logical bands using the sequence numbers. Block 64 may also check a footer of each logical band to determine a state of the logical band (e.g., clean, closed, corrupted, etc.). Block 64 may, for example, check the last 4 bytes of each logical band to identify a status token (e.g., closed token, etc.), a checksum for the logical band, etc. The footer of a clean logical band may be empty. Thus, block 64 may identify a last open logical band and rebuild a logical band linked list using header and footer metadata.

Block 64 may then walk from the beginning of the identified last opened logical band and calculate the checksum of each complete logical band entry along the way. Notably, block 64 knows the start of a next logical band entry although variable key-value pair sizes are accommodated since the length of the logical band entry is known (e.g., via a header having a fixed-length key length field and value length field and a fixed-length checksum). Block 64 may add an appropriate length to a current offset to obtain the address of the next logical band entry. When an error is encountered, block 64 sets that logical band entry as the write position. If no error is encountered, block 64 sets the write position to an incomplete logical band entry in that logical band or to the end of a last error-free and complete logical band entry.

Block 64 may then rebuild the indexing structure to recover the latest copy of the indexing structure by replaying the key-value pairs in all of the logical bands. For example, block 64 may use the linked list of closed logical bands which are sorted by sequence number to start to replay the key-value pairs from closed logical bands beginning with the lowest sequence number, and update the corresponding indexing structure until the current write position of the last open logical band is reached. If an operation was being completed during the failure, and no data was written or deleted (e.g., no delete token was dropped to the write position), there is either incomplete data, corrupted data, and/or absence of acknowledgement for the command to the host. Thus, the host will readily determine whether to issue another command for the key-value pair.

When the indexing structure is rebuilt, block 64 may rebuild the logical band invalidity datastore, the statistics datastore, etc., implementing a similar approach (e.g., identify a latest valid copy of each data structure and replay the logical bands from a recorded band index). Recovery may be accelerated by storing any or all of the structures to a storage device periodically (e.g., every minute, every hour, etc.). For example, block 64 may store the indexing structure to a SSD so that replay can begin from a last stored logical band rather than a first logical band that has been ordered. Thus, the logical band index may operate a timestamp.

Block 64 may also recover from an intended shutdown and/or restart. For example, block 64 may write data in system memory to a storage device including nodes (e.g., hash table entries), logical band metadata for a currently open logical band, logical band entries for the currently open logical band, a logical band journal for the open logical band, an invalidity datastore, a logical band linked list (e.g., a status table, etc.), a statistics datastore, and so on. Notably, one or more data structures may be kept on a storage device (e.g., SSD, etc.), and write-back cached in host memory (e.g., DRAM, etc.). During restart from an intended shutdown, block 64 may first load the logical band linked list to build a clean/closed logical band list. Block 64 may then re-open the last opened logical band, and restore a write pointer to the appropriate offset. Block 64 may also load the open logical band metadata and logical band journal. Block 64 may further load the invalidity datastore and statistic datastore, and prepare for host commands.

While independent blocks and/or a particular order has been shown for illustration purposes, it should be understood that one or more of the blocks of the method 58 may be combined, omitted, bypassed, re-arranged, and/or flow in any order. Moreover, any or all blocks of the method 58 may be automatically implemented (e.g., without human intervention, etc.).

Figure 7:
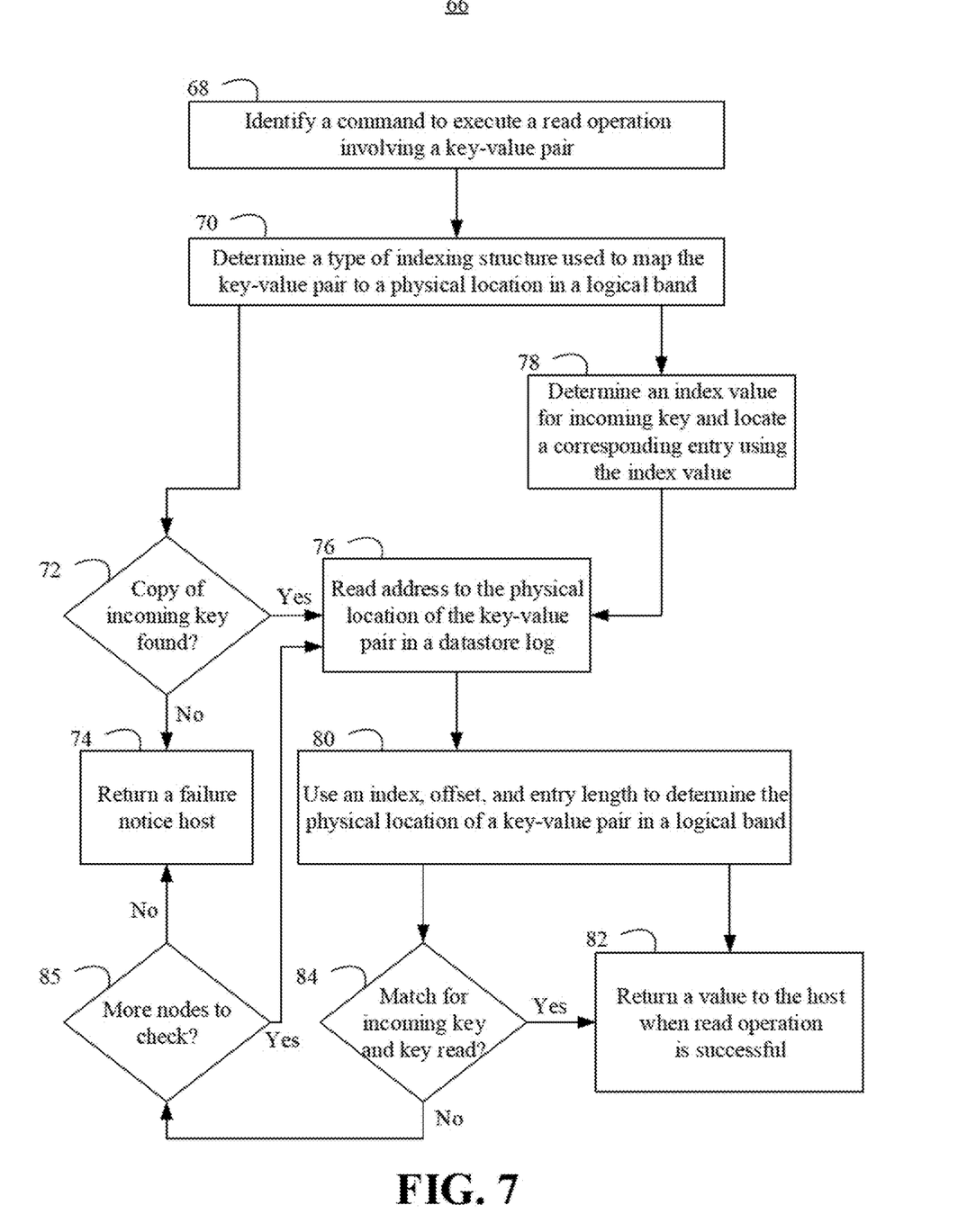
FIG. 7 is a flowchart of an example of a method to complete a read operation according to an embodiment.

Turning now to FIG. 7, a method 66 is shown to complete a read operation according to an embodiment. The method 66, which may generally be implemented in the logic 54 (FIG. 1), may readily substitute or supplement block 64 (FIG. 2), already discussed. The method 66 may be implemented as a set of logic instructions stored in a machine- or computer-readable storage medium such as RAM, ROM, PROM, firmware, flash memory, 3DXP memory, etc., in configurable logic such as, for example, PLAs, FPGAs, CPLDs, or any combination thereof.

Illustrated processing block 68 identifies a command to execute a read operation involving a key-value pair from a host (e.g., an application, a host processor, etc.). The command may include a Get(Key) command, wherein "Key" specifies an incoming key. Illustrated processing block 70 determines a type of indexing structure used to map the key-value pair to a physical location in a logical band. If the indexing structure is a structure that stores a copy of a key at a node (e.g., tree-based indexing structure, etc.), a determination may be made at block 72 whether a copy of the incoming key is found in a node of the indexing structure. If not, then illustrated processing block 74 returns a failure notice to the host indicating that the key does not exist (or is not found). If a copy of the incoming key is found, then illustrated processing block 76 reads an address to the physical location of the key-value pair in a datastore log. The address may include a logical band index, a logical band offset, and a logical band entry length.

If, however, the indexing structure does not store a copy of a key in a node (e.g., hash-based indexing structure, etc.), illustrated processing block 78 determines an index value for the incoming key (e.g., calculate a hash value for the incoming key, etc.) and then locates a corresponding entry (e.g., hash table entry, etc.) using the index value (e.g., via a hash table index, such a 0x000000 for hash table entry 1, 0x000001 for hash table entry 2, etc.). Each entry in a hash table may, for example, be a linked list with a first node and a second node saved in the linked list (e.g., hash table entry) and which may include a pointer to other nodes in the linked list that are saved in a further storage space. Each node may further include an address to a respective key-value pair together with a key-value length, and/or a secondary hash (e.g., to reduce false positive probability, etc.). In this regard, each node needs to be checked to determine whether a particular node of the linked list corresponds to the incoming key. Thus, block 76 reads the address stored at the first node of the hash table entry. Illustrated processing block 80 then reads the key-value pair from the datastore log using the address determined at block 76. Thus, for example, block 80 uses the logical band index, the logical band offset, and the logical band entry length to determine the physical location of a key-value pair.

Illustrated processing block 82 returns a value to the host when the read operation is successful. For example, block 82 returns the value from the key-value pair when the copy of the key is found at block 72 and the key-value pair is read from the datastore log at block 80 using the address stored at the indexing structure. Additionally, block 82 returns the value from the key-value pair when block 84 determines that there is a match between the incoming key and the key of the key-value pair read from the datastore log at block 80. If there is no match at block 84, a determination may be made at block 85 whether there are more nodes to check in the indexing structure. If so, block 76 reads the address stored at the second node of the hash table entry, and so on, until no more nodes remain. If all nodes in the hash table entry have been checked, block 74 returns a failure notice to the host indicating that the key does not exist (or is not found).

Notably, variations of a read may be performed using the method 66. For example, a determination may be made whether a SCAN operation is supported by the indexing structure. If so, the client/application may use the indexing structure to order keys in a range, and then perform a Get(Key) for each key. Also, while independent blocks and/or a particular order has been shown for illustration purposes, it should be understood that one or more of the blocks of the method 66 may be combined, omitted, bypassed, re-arranged, and/or flow in any order. Moreover, any or all blocks of the method 66 may be automatically implemented (e.g., without human intervention, etc.).

Figure 8:
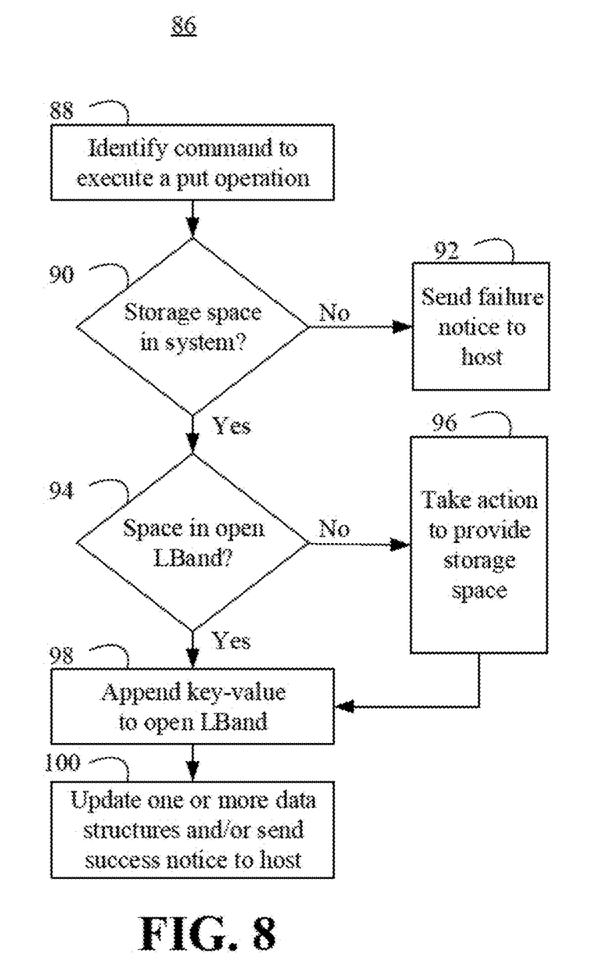
FIG. 8 is a flowchart of an example of a method to complete a put operation according to an embodiment.

FIG. 8 shows a method 86 to complete a put operation according to an embodiment. The method 86, which may generally be implemented in the logic 54 (FIG. 1), may readily substitute or supplement block 64 (FIG. 2), already discussed. The method 86 may be implemented as a set of logic instructions stored in a machine- or computer-readable storage medium such as RAM, ROM, PROM, firmware, flash memory, 3DXP memory, etc., in configurable logic such as, for example, PLAs, FPGAs, CPLDs, or any combination thereof.

Illustrated processing block 88 identifies a command to execute a put operation involving a key-value pair from a host (e.g., from an application, from a host processor, etc.). The command may include a Put(Key, Value) command, wherein "Key" specifies an incoming key and "Value" specifies an incoming value. A determination may be made at block 90 whether there is sufficient storage space in a storage system. In one example, the determination at block 90 may be based on system metadata that is updated after each put operation and delete operation. If there is insufficient space, illustrated processing block 92 returns a failure notice to the host indicating that the operation has failed or cannot proceed.

If there is sufficient storage space, a determination may be made at block 94 whether there is sufficient space in a currently open logical band. In one example, block 94 may use a current offset and/or a write position of the currently open logical band that is tracked to determine available storage capacity. The current offset and/or the write position may be updated each time data (e.g., key-value pair, delete token, etc.) is written to the currently open logical band. Thus, a storage value may be checked, that represents a difference between a maximum storage capacity of a logical band and an accumulation of a length of data added, to track available storage capacity.

If there is insufficient storage space available, illustrated processing block 96 takes action to provide storage space. Block 96 may open a new logical band. In one example, block 96 may open a new logical band when a next key-value pair is larger than the available space in the currently open logical band. In this regard, block 96 closes the currently open logical band and opens the new logical band. Block 96 may obtain the new logical band from a logical band linked list and store the closed logical band in the logical and linked list. Block 96 may also implement defragmentation (e.g., garbage collection). Notably, block 96 may trigger defragmentation independently of the put operation. For example, block 96 may trigger defragmentation based on a determination that a total number of clean logical bands is below a predetermined number (e.g., 2).

Block 96 may, for example, consult an invalidity datastore (e.g., invalidity table, etc.) to select a logical band for defragmentation from among a plurality of closed logical bands (e.g., from a closed logical band list). In one example, the invalidity datastore may include how much data in a corresponding logical band is invalid, wherein the invalidity count (e.g., number of invalid bytes per logical band, etc.) for the corresponding logical band may be updated after each read operation and after each overwrite operations. In addition, the invalidity datastore may include an erase count (e.g., a particular logical band has been erased 1000 times, the difference between one logical band and a most erased logical band is more than 1000, etc.). Block 96 may ascribe equal or different weights to the invalidity count and the erase count.

Block 96 may, for example, consider wear-leveling to select a logical band for defragmentation. In one example, a storage device such as an SSD may include multiple NAND flash blocks with a limited number of erase cycles wherein a block may no longer be usable past an erase cycle threshold and/or may have degradation in characteristics (e.g., worse performance, consume more power, etc.) with increasing erase count. Block 96 may balance the erase cycles of the blocks by managing the erase cycles of the logical bands since the logical bands are erased after defragmentation and since some workloads may erase some of the logical bands more frequently than others. Thus, block 96 may ascribe more weight to the erase count for balancing erase cycles and select a logical band with a lower invalidity count (e.g., compared to a highest invalidity count, etc.).

Block 96 may further relocate all valid data from the selected/target logical band to an open logical band. For example, block 96 may relocate all valid data from the target logical band to a newly opened logical band. When the relocation is complete, block 96 may erase the sequence number of the target logical band, erase the target logical band, and store the defragmented (e.g., clean, erased, etc.) target logical band in the logical band linked list (e.g., to the tail of the linked list, etc.). Notably, block 96 may implement relocation based on a type of indexing structure that is associated with the target logical band. For example, block 96 may walk through the target logical band to identify the valid data (e.g., valid key-value pairs) when the indexing structure is a tree-based structure or a hash-based structure, and/or may walk through the logical band journal of the target logical band when the indexing structure is a hash-based structure.

Block 96 may, for example, read a key-value pair (e.g., K1V1 at address 1) from the target logical band and use the key (K1) from the read key-value pair to locate the address stored at the node for that key (e.g., index, offset, entry length). If there is a match between the address stored at the node and the actual address for the key-value pair read from the target logical band (e.g., index, offset, entry length=address 1) then the key-value pair is valid and will be relocated. If there is a mismatch, then the key-value pair is invalid data and will be erased during defragmentation.

A mismatch may occur when, for example, the data for a key is overwritten to a different physical location in the datastore log since the node of the indexing structure will include a current address for the key-value pair that points to the latest location in the datastore log. For example, the key-value pair (K1V1) may be overwritten with another key-value pair (K1V2) in the target logical band, and the address stored at the node for that key may be updated to the latest address (e.g., index, offset, entry length=address n for K1V2). As discussed above, the logical band index and the length of the stale key-value pair (K1V1) can be found from the indexing structure and the corresponding invalidity datastore may be updated the length of the state key-value pair.

Continuing with this example, the first lookup for the key-value pair (K1V1) during defragmentation results in a mismatch (e.g., index, offset, entry length # address 1) while another lookup for the current key-value pair (K1V2) during defragmentation results in a match (e.g., index, offset, entry length=address n). In this case, the key-value pair (K1V1) will be erased and the key-value pair (K1V2) will be relocated. Additionally, a mismatch may occur when the address stored at the node is a null address that indicates the key-value pair has been deleted. Block 96 may, for example, determine the data read in the logical band entry is invalid based on a delete token at the logical band entry and may not need to refer to the null address to determine a match.

Block 96 may further consult the logical band journal to accelerate defragmentation. In one example, the logical band journal may be used when, for example, the size of keys is relatively small (e.g., up to about 20 bytes) and/or when key prefixes are used (e.g., username, etc.). Moreover, a logical band journal itself may have variable size (e.g., based on a number of key-value pairs stored in the logical band) and/or each logical band journal entry may have a fixed size. The logical band journal may save a hash table entry index and locations of all the key-value pairs in a corresponding logical band. Block 96 may, therefore, load the logical band journal and a hash table to check if any keys of the key-value pairs point to a corresponding location and only read a key-value pair from the logical band when the location matches. For example, each logical band journal entry may include a first pointer to an entry in a hash table and a second pointer to a key-value pair stored in a logical band. Accordingly, each logical band journal entry may point to each key-value pair (or the logical band entry) in a logical band and an entry in the hash table. For any given logical band journal entry, block 96 may locate the corresponding location of the key-value pair (or the logical band entry) that the logical band journal entry points to. Additionally, one address (e.g., location) of the key-value pair may be determined from the logical band entry and one address of the key-value pair may be determined from the indexing structure (e.g., hash table, etc.). Thus, block 96 may compare the two address for a match evaluation.

Illustrated processing block 98 appends the key-value pair to the write position of the current open logical band when block 94 determines that there is sufficient space and/or block 96 takes action to provide storage space. Block 98 may, for example, populate a logical band header for a logical band entry with data for a type, a length of a key, a length of a value, with the key-value pair, and with a checksum. Block 98 may also utilize a write buffer before writing the key-value pair (e.g., before writing data to an SSD). Block 98 may, for example, check if the key-value pair is aligned with a boundary of a first buffer and if so (e.g., may be accommodated by the first buffer) may write the key-value pair to the first buffer and flush the first buffer to the logical band when full. If the key-value pair is not aligned with the boundary of the first buffer, block 98 may write the unaligned portions of the key-value pair to a second buffer and flush the first buffer to the logical band as full. Block 98 may repeat writing to the second buffer and revert back to the first buffer, and so on, as needed.

Illustrated processing block 100 updates one or more data structures. For example, block 100 updates the indexing structure with the current address for the key-value pair in the logical band (e.g., current index, offset, entry length, etc.). Block 100 may also update system level datastores such as an invalidity datastore, the logical band linked list, and/or the statistics information. Block 100 may further update the logical band journal (e.g., for hash table implementations, etc.). In addition, block 100 may return a success notice to the host indicating the key-value pair has been added.

While independent blocks and/or a particular order has been shown for illustration purposes, it should be understood that one or more of the blocks of the method 86 may be combined, omitted, bypassed, re-arranged, and/or flow in any order. Moreover, any or all blocks of the method 86 may be automatically implemented (e.g., without human intervention, etc.).

Figure 9:
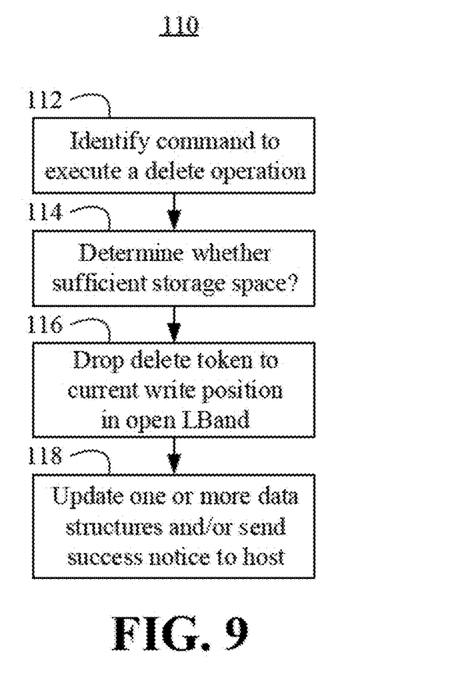
FIG. 9 is a flowchart of an example of a method to complete a delete operation according to an embodiment.

Turning now to FIG. 9, a method 110 is shown to complete a delete operation according to an embodiment. The method 110, which may generally be implemented in the logic 54 (FIG. 1), may readily substitute or supplement block 64 (FIG. 2), already discussed. The method 86 may be implemented as a set of logic instructions stored in a machine- or computer-readable storage medium such as RAM, ROM, PROM, firmware, flash memory, 3DXP memory, etc., in configurable logic such as, for example, PLAs, FPGAs, CPLDs, or any combination thereof.

Illustrated processing block 112 identifies a command to execute a delete operation involving a key-value pair from a host (e.g., from an application, from a host processor, etc.). The command may include a Delete(Key) command, wherein "Key" specifies an incoming key. Illustrated processing block 114 determines whether there is sufficient storage space to drop a delete token. Block 114 may, therefore, implement similar functionality as blocks 90-96 (FIG. 8), already discussed. If there is sufficient space to drop a delete token, illustrated processing block 116 drops the delete token to a current write position of the currently open logical band.

Accordingly, block 116 may implement similar functionality as block 98 (FIG. 8), already discussed. In this regard, however, block 116 may set the type field to "Token" and populate the logical band entry header with a delete token rather than a value. Notably, the prior stored key-value pair that becomes stale when the delete token is dropped may not be erased until defragmentation, similar to when a value is overwritten. Thus, illustrated processing block 118 updates one or more structures. In this regard, block 118 may include similar functionality as block as block 100 (FIG. 8), already discussed. For example, block 118 may replace the address for the key in the indexing structure with a current value (e.g., a null value). Block 118 may free the node to store data corresponding to other keys, and may return a success notice to the host indicating the key-value pair has been deleted.

While independent blocks and/or a particular order has been shown for illustration purposes, it should be understood that one or more of the blocks of the method 110 may be combined, omitted, bypassed, re-arranged, and/or flow in any order. Moreover, any or all blocks of the method 110 may be automatically implemented (e.g., without human intervention, etc.).

Figure 10:
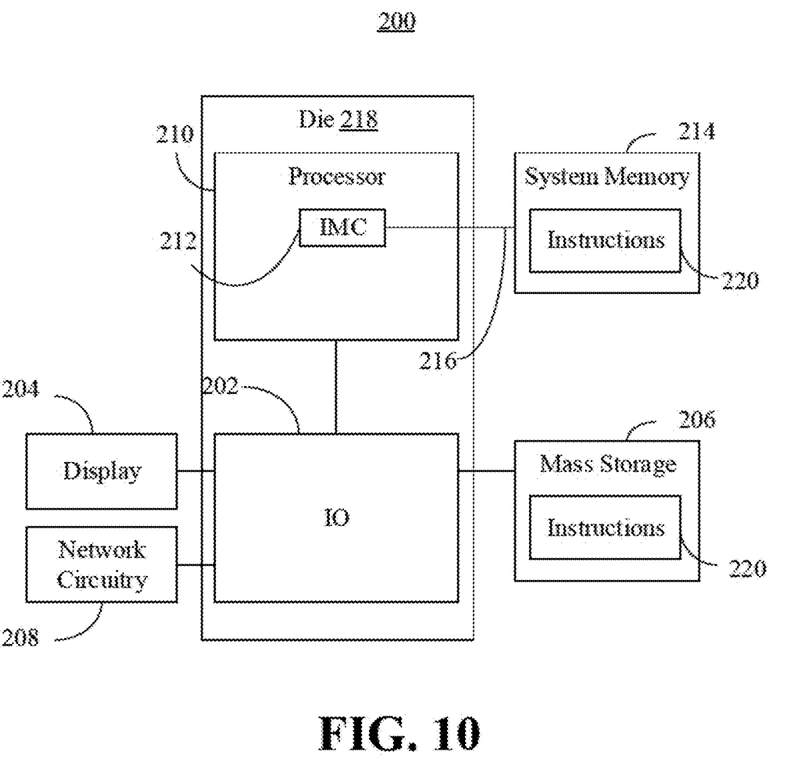
FIG. 10 is a block diagram of an example of a computing system according to an embodiment.

FIG. 10 shows a computing system 200 according to an embodiment. The system 200 may generally be part of a server, desktop computer, notebook computer, tablet computer, convertible tablet, smart television (TV), personal digital assistant (PDA), mobile Internet device (MID), smart phone, wearable device, media player, gaming console, etc., or any combination thereof. In the illustrated example, an input/output (IO) module 202 is communicatively coupled to a display 204 (e.g., liquid crystal display/LCD, light emitting diode/LED display, touch screen), a mass storage device 206 (non-volatile memory/NVM, hard disk drive/HDD, optical disk, solid state disk/SSD, flash memory) and a network interface circuitry 208 (e.g., network controller, network interface card/NIC).

The illustrated system 200 also includes a processor 210 (e.g., host processor, CPU) that includes an integrated memory controller (IMC) 212 which communicates with system memory 214 (e.g., volatile memory, dynamic random access memory/DRAM, 3DXP memory) over a bus 216 or other suitable communication interface. The communication interface may operate in compliance with, for example, NVMe (NVM Express) over PCIe (Peripheral Components Interconnect Express), SATA (Serial Advanced Technology Attachment), SAS (Serial Attached SCSI/Small Computer System Interface), PCIe, and so forth. In addition, the processor 210 and the IO module 202 may be integrated onto a shared semiconductor die 218 in a system on chip (SoC) architecture. In one example, the SoC components communicate via a bus architecture such as an Advance Microcontroller Bus Architecture (AMBA, ARM, Ltd.).

The mass storage device 206 may, for example, include non-volatile memory that may refer to a storage medium that does not require power to maintain the state of data stored by the medium. In one embodiment, a memory device is a block addressable memory device, such as those based on NAND or NOR technologies. A memory device may also include future generation nonvolatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product.

The system memory 214 may include, for example, volatile memory which may refer to a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www*jedec*org). Such standards (and similar standards) may be referred to as DDR-based standards and communication interfaces of the storage devices that implement such standards may be referred to as DDR-based interfaces.

Accordingly, the mass storage device 206 may be readily substituted for the the memory device 12 (FIG. 1), already discussed. Moreover, the processor 210 may be readily substituted for the processor 56 (FIG. 1), already discussed. In addition, the mass storage device 206 and/or the system memory 214 may store instructions 220, which when executed by the processor 210, cause the system 200 to perform one or more aspects of the method 58 (FIG. 2), including one or more aspects of the operations 1-4 (FIG. 3-FIG. 6), of the method 66 (FIG. 7), of the method 86 (FIG. 8), and/or of the method 110 (FIG. 9), already discussed.

Figure 11:
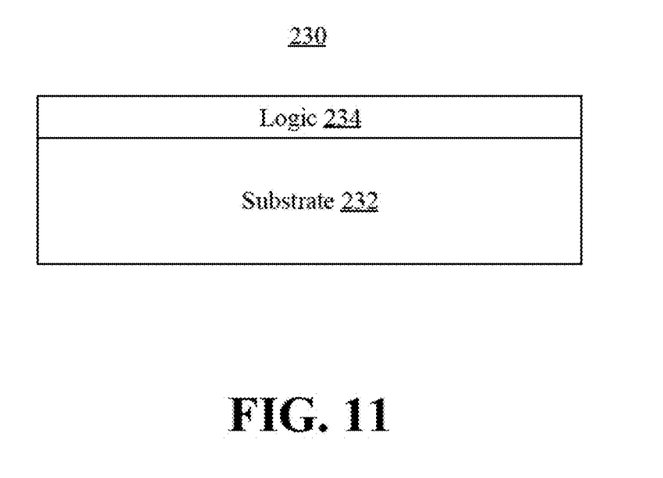
FIG. 11 is a block diagram of an example of a semiconductor package apparatus according to an embodiment.

Turning now to FIG. 11, a semiconductor package apparatus 230 (e.g., chip) is shown that includes a substrate 232 (e.g., silicon, sapphire, gallium arsenide, etc.) and logic 234 (e.g., transistor array and other integrated circuit/IC components) coupled to the substrate 232. The logic 234 may be readily substituted for the logic 54 (FIG. 1), already discussed. Moreover, the logic 234, which may be implemented at least partly in configurable logic and/or fixed-functionality logic hardware, may generally implement one or more aspects of the method 58 (FIG. 2), including one or more aspects of the operations 1-4 (FIG. 3-FIG. 6), of the method 66 (FIG. 7), of the method 86 (FIG. 8), and/or of the method 110 (FIG. 9), already discussed. Thus, the logic 54 (FIG. 1), the processor 56 (FIG. 1), and/or the processor 210 (FIG. 10), already discussed, may implement the same or similar functionality as the logic 234.

The logic 234 may, for example, execute an operation involving a key-value pair. In one example, the logic 234 may be communicatively coupled to an indexing structure that stores data corresponding to a key of the key-value pair and an address for the key-value pair, a datastore log that is separate from the indexing structure and that stores the key-value pair at the address in a logical band of a plurality of independent logical bands, and/or a storage device such as an SSD. The logic 234 may further map the datastore log to a file system, logical block addressing, and/or storage device physical bands to divide the datastore log into a plurality of independent logical bands.

Moreover, the logic 234 to populate each logical band of the plurality with data for a logical band header, a logical band entry, a logical band footer, and/or a logical band journal. The logic 234 may, for example, populate the logical band header with a sequence number. The logic 234 may further populate the logical band entry with data for a logical band entry header. In one example, the logic 234 may populate the logical band entry header with data for a type field (e.g., "KV", "Token", "Pad", etc.), with data for a key length field (e.g., length of a key etc.), with data for a value length field (e.g., length of a value etc.), with a key-value pair (e.g., a key-delete token pair, etc.), and/or with an error detection code for the key-value pair. Additionally, the logic 234 may populate the footer with metadata for the logical band (e.g., a status token, an error code etc.). The logic 234 may further populate the logical band journal with a hash table entry (e.g., when the indexing structure is a hash table, etc.).

The logic 234 may further insert a current address for the key-value pair at the indexing structure. The current address may include a null value, a current logical band index, a current logical band offset, a current logical band entry length, and so on. The logic 234 may further manage one or more system level datastores. The logic 234 may update an invalidity datastore with an invalidity count and/or with an erase count (e.g., when the erase count is to be tracked). The logic 234 may update a logical band linked list with a clean logical band and/or with a closed logical band. The logic 234 may obtain a next clean logical band from the logical band linked list when needed. The logic 234 may also update statistic information in a statistics datastore for a storage system.

The logic 234 may further collect one or more logical bands during defragmentation. The logic 234 may select a target logical band based on an invalidity count and/or based on an erase count (e.g., collected by a SSD device, by a component outside of the SSD device, etc.). The logic 234 may relocate all valid key-value pairs from the target logical band to a current logical band and erase the target logical band (e.g., all data in the logical band). In this regard, the logic 234 may return the erased logical band to the logical band linked list. The logic 234 may further recover data in response to failure (e.g., power failure recovery, device failure recovery, etc.), a restart, and so on. The logic 234 may recover a most recent logical band, a most recent indexing structure, and/or a most recent system level datastore. In one example, the logic 234 may use a stored copy of a data structure to recover the data structure. In another example, the logic 234 may rebuild a data structure to recover the data structure.

ADDITIONAL NOTES AND EXAMPLES

Example 1 may include a computing system to store data comprising a processor communicatively coupled to an indexing structure and a datastore log separate from the indexing structure, wherein the indexing structure is to store key data corresponding to a key of a key-value pair and an address for the key-value pair, and wherein the datastore log is to store the key-value pair at the address in a logical band of a plurality of independent logical bands, and one or more memory devices coupled to the processor, the one or more memory devices including instructions, which when executed by the processor, cause the computing system to execute an operation involving the key-value pair.

Example 2 may include the computing system of Example 1, wherein the instructions, when executed, cause the computing system to map the datastore log to one or more of a file system, logical block addressing, or storage device physical bands to divide the datastore log into the plurality of independent logical bands.

Example 3 may include the computing system of any one of Examples 1 to 2, wherein the instructions, when executed, cause the computing system to populate at least one logical band of the plurality with data for one or more of a logical band header, a logical band entry, a logical band footer, or a logical band journal.

Example 4 may include the computing system of any one of Examples 1 to 3, wherein the instructions, when executed, cause the computing system to populate the logical band header with a sequence number, populate the logical band entry with data for a logical band entry header, populate the footer with one or more of a status token or an error code, and populate the logical band journal with a hash table entry when the indexing structure is a hash table.

Example 5 may include the computing system of any one of Examples 1 to 4, wherein the logical band entry header is to include a type field, a key length field, a value length field, the key-value pair, and an error code for the key-value pair.

Example 6 may include the computing system of any one of Examples 1 to 5, wherein the instructions, when executed, cause the computing system to insert a current address for the key-value pair at the indexing structure.

Example 7 may include the computing system of any one of Examples 1 to 6, wherein the instructions, when executed, cause the computing system to update an invalidity datastore with an invalidity count and with an erase count when the erase count is to be tracked, update a logical band linked list with a clean logical band or a closed logical band and obtain a next clean logical band from the logical band linked list when needed, and update statistic information in a statistics datastore for the storage system.

Example 8 may include the computing system of any one of Examples 1 to 7, wherein the instructions, when executed, cause the computing system to select a target logical band based on an invalidity count and an erase count and relocate all valid key-value pairs from the target logical band to a current logical band and erase the target logical band, and recover one or more of a last opened logical band, a most recent indexing structure, or a most recent system level datastore.

Example 9 may include an apparatus to store data comprising a substrate, and logic coupled to the substrate and communicatively coupled to an indexing structure and a datastore log separate from the indexing structure, wherein the indexing structure is to store key data corresponding to a key of a key-value pair and an address for the key-value pair, wherein the datastore log is to store the key-value pair at the address in a logical band of a plurality of independent logical bands, and wherein the logic is configured at least partly in one or more of configurable logic or fixed-functionality hardware logic to execute an operation involving the key-value pair.

Example 10 may include the apparatus of Example 9, wherein the logic is to map the datastore log to one or more of a file system, logical block addressing, or storage device physical bands to divide the datastore log into the plurality of independent logical bands.

Example 11 may include the apparatus of any one of Examples 9 to 10, wherein the logic is to populate at least one logical band of the plurality with data for one or more of a logical band header, a logical band entry, a logical band footer, or a logical band journal.

Example 12 may include the apparatus of any one of Examples 9 to 11, wherein the logic is to populate the logical band header with a sequence number, populate the logical band entry with data for a logical band entry header, populate the footer with one or more of a status token or an error code, and populate the logical band journal with a hash table entry when the indexing structure is a hash table.

Example 13 may include the apparatus of any one of Examples 9 to 12, wherein the logical band entry header is to include a type field, a key length field, a value length field, the key-value pair, and an error code for the key-value pair.

Example 14 may include the apparatus of any one of Examples 9 to 13, wherein the logic is to insert a current address for the key-value pair at the indexing structure.

Example 15 may include the apparatus of any one of Examples 9 to 14, wherein the logic is to update an invalidity datastore with an invalidity count and with an erase count when the erase count is to be tracked, update a logical band linked list with a clean logical band or a closed logical band and obtain a next clean logical band from the logical band linked list when needed, and update statistic information in a statistics datastore for the storage system.

Example 16 may include the apparatus of any one of Examples 9 to 15, wherein the logic is to select a target logical band based on an invalidity count and an erase count and relocate all valid key-value pairs from the target logical band to a current logical band and erase the target logical band, and recover one or more of a last opened logical band, a most recent indexing structure, or a most recent system level datastore.

Example 17 may include at least one computer readable storage medium comprising a set of instructions, which when executed by a processor, cause the processor to store in an indexing structure key data corresponding to a key of a key-value pair and an address for the key-value pair, store in a datastore log separate from the indexing structure the key-value pair at the address in a logical band of a plurality of independent logical bands, and execute an operation involving the key-value pair.

Example 18 may include the at least one computer readable storage medium of Example 17, wherein the instructions, when executed, cause the processor to map the datastore log to one or more of a file system, logical block addressing, or storage device physical bands to divide the datastore log into the plurality of independent logical bands.

Example 19 may include the at least one computer readable storage medium of any one of Examples 17 to 18, wherein the instructions, when executed, cause the processor to populate at least one logical band of the plurality with data for one or more of a logical band header, a logical band entry, a logical band footer, or a logical band journal.

Example 20 may include the at least one computer readable storage medium of any one of Examples 17 to 19, wherein the instructions, when executed, cause the processor to populate the logical band header with a sequence number, populate the logical band entry with data for a logical band entry header, populate the footer with one or more of a status token or an error code, and populate the logical band journal with a hash table entry when the indexing structure is a hash table.

Example 21 may include the at least one computer readable storage medium of any one of Examples 17 to 20, wherein the instructions, when executed, cause the processor to wherein the logical band entry header is to include a type field, a key length field, a value length field, the key-value pair, and an error code for the key-value pair.

Example 22 may include the at least one computer readable storage medium of any one of Examples 17 to 21, wherein the instructions, when executed, cause the processor to insert a current address for the key-value pair at the indexing structure.

Example 23 may include the at least one computer readable storage medium of any one of Examples 17 to 22, wherein the instructions, when executed, cause the processor to update an invalidity datastore with an invalidity count and with an erase count when the erase count is to be tracked, update a logical band linked list with a clean logical band or a closed logical band and obtain a next clean logical band from the logical band linked list when needed, and update statistic information in a statistics datastore for a storage system.

Example 24 may include the at least one computer readable storage medium of any one of Examples 17 to 23, wherein the instructions, when executed, cause the processor to select a target logical band based on an invalidity count and an erase count, and relocate all valid key-value pairs from the target logical band to a current logical band and erase the target logical band, and recover one or more of a last opened logical band, a most recent indexing structure, or a most recent system level datastore.

Example 25 may include a method to store data comprising storing in an indexing structure key data corresponding to a key of a key-value pair and an address for the key-value pair, storing in a datastore log separate from the indexing structure the key-value pair at the address in a logical band of a plurality of independent logical bands, and executing an operation involving the key-value pair.

Example 26 may include the method of Example 25, further including mapping the datastore log to one or more of a file system, logical block addressing, or storage device physical bands to divide the datastore log into the plurality of independent logical bands.

Example 27 may include the method of any one of Examples 25 to 26, further including populating at least one logical band of the plurality with data for one or more of a logical band header, a logical band entry, a logical band footer, or a logical band journal.

Example 28 may include the method of any one of Examples 25 to 27, further including populating the logical band header with a sequence number, populating the logical band entry with data for a logical band entry header, populating the footer with one or more of a status token or an error code, and populating the logical band journal with a hash table entry when the indexing structure is a hash table.

Example 29 may include the method of any one of Examples 25 to 28, wherein the logical band entry header is to include a type field, a key length field, a value length field, the key-value pair, and an error code for the key-value pair.

Example 30 may include the method of any one of Examples 25 to 29, further including inserting a current address for the key-value pair at the indexing structure.

Example 31 may include the method of any one of Examples 25 to 30, updating an invalidity datastore with an invalidity count and with an erase count when the erase count is to be tracked, updating a logical band linked list with a clean logical band or a closed logical band and obtain a next clean logical band from the logical band linked list when needed, and updating statistic information in a statistics datastore for a storage system.

Example 32 may include the method of any one of Examples 25 to 31, further including selecting a target logical band based on an invalidity count and an erase count, and relocating all valid key-value pairs from the target logical band to a current logical band and erase the target logical band, and recovering one or more of a last opened logical band, a most recent indexing structure, or a most recent system level datastore.

Example 33 may include an apparatus to store data comprising means for performing the method of any one of Examples 25 to 32.

Technology described herein may therefore allow for an index-interoperable datastore log that provides efficiencies in WA, RA, defragmentation, wear-leveling, and so on. Moreover embodiment may utilize Storage Performance Development Kit (SPDK) to map a logical band directly to LBAs without using file system level access. Additionally, embodiments may modify existing SSD firmware to map a logical band to a physical band directly without using SSD flash translation layer. SSD cost may be reduced (e.g., less DRAM and NAND flash over-provisioning). In addition, write performance of small KV pairs may be maximized. Embodiments may utilize a write buffer (such as 8KiB) for PUT operations, wherein all the key-value pair data may be written to the write buffer first before being written to the SSD. Embodiments may divide the 8KiB write buffer into two 4KiB ping-pong buffers. When one of the buffer is full, it is flushed to the SSD while the other one may continue serving incoming key-value pairs.

Embodiments may further store data structures in persistent memory, which may be optionally cached in DRAM (e.g., write back, write through cache, etc.). In this regard, DRAM consumption may be reduced, NAND may read and write, and/or overall system performance may be improved. Moreover startup/recovering time after system crash or power fail may be reduced. Additionally, in-memory key-value database may be introduced as a layer above indexing structures. In this regard, system DRAM or persistent memory may be used to implement the in-memory key-value database. In addition, defragmentation may be accelerated via an on-SSD-copy command. Further, overall performance may be accelerated via an in-SSD Integrated Memory Buffer (IMB). For example, embodiments may use the IMB for statistics tracking and write buffering. Embodiments may further provide, for example, compression and/or data dedupe, index structure updates in a separate SSD stream from the logical band operations (e.g., writes, etc.), index structure read from SSD at 512B granularity on Get with write at 4KiB or larger (multiple IUs) granularity on Put, and so on.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" or "at least one of" may mean any combination of the listed terms. For example, the phrases "one or more of A, B or C" may mean A; B; C; A and B; A and C; B and C; or A, B and C. In addition, a list of items joined by the term "and so on" or "etc." may mean any combination of the listed terms as well any combination with other terms.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. A computing system comprising:
   a processor communicatively coupled to an indexing structure and a datastore log separate from the indexing structure, wherein the indexing structure is to store key data corresponding to a key of a key-value pair and an address for the key-value pair, and wherein the datastore log is to store the key-value pair at the address in a logical band of a plurality of independent logical bands;
   one or more memory devices coupled to the processor, the one or more memory devices including instructions, which when executed by the processor, cause the computing system to:
   execute an operation involving the key-value pair;
   populate at least one logical band of the plurality of independent logical bands with data for a logical band footer so that the logical band footer is to include one or more of a status token or an error code;
   populate the at least one logical band with data for one or more of a logical band header, a logical band entry or a logical band journal;
   populate the logical band header with a sequence number;
   populate the logical band entry with data for a logical band entry header; and
   populate the logical band journal with a hash table entry when the indexing structure is a hash table.

2. The computing system of claim 1, wherein the instructions, when executed, cause the computing system to map the datastore log to one or more of a file system, logical block addressing, or storage device physical bands to divide the datastore log into the plurality of independent logical bands.

3. The computing system of claim 1, wherein the logical band entry header is to include a type field, a key length field, a value length field, the key-value pair, and an error code for the key-value pair.

4. The computing system of claim 1, wherein the instructions, when executed, cause the computing system to insert a current address for the key-value pair at the indexing structure.

5. The computing system of claim 1, wherein the instructions, when executed, cause the computing system to:
   update an invalidity datastore with an invalidity count and with an erase count when the erase count is to be tracked;
   update a logical band linked list with a clean logical band or a closed logical band and obtain a next clean logical band from the logical band linked list when needed; and
   update statistic information in a statistics datastore for the computing system.

6. The computing system of claim 1, wherein the instructions, when executed, cause the computing system to:
   select a target logical band based on an invalidity count and an erase count, and relocate all valid key-value pairs from the target logical band to a current logical band and erase the target logical band; and
   recover one or more of a last opened logical band, a most recent indexing structure, or a most recent system level datastore.

7. A storage system comprising:
   a memory that includes an indexing structure and a datastore log separate from the indexing structure, wherein the indexing structure is to store key data corresponding to a key of a key-value pair and an address for the key-value pair, wherein the datastore log is to store the key-value pair at the address in a logical band of a plurality of independent logical bands; and
   a memory controller communicatively coupled to the memory, and wherein the memory controller is configured in circuitry to:
   execute an operation involving the key-value pair;
   populate a footer of at least one logical band of the plurality of independent logical bands with one or more of a status token or an error code;
   populate a logical band header with a sequence number;
   populate a logical band entry with data for a logical band entry header; and
   populate a logical band journal with a hash table entry when the indexing structure is a hash table.

8. The storage system of claim 7, wherein the logical band entry header is to include a type field, a key length field, a value length field, the key-value pair, and an error code for the key-value pair.

9. The storage system of claim 7, wherein the memory controller is to insert a current address for the key-value pair at the indexing structure.

10. The storage system of claim 7, wherein the memory controller is to:
    update an invalidity datastore with an invalidity count and with an erase count when the erase count is to be tracked;
    update a logical band linked list with a clean logical band or a closed logical band and obtain a next clean logical band from the logical band linked list when needed; and
    update statistic information in a statistics datastore for a storage system.

11. The storage system of claim 7, wherein the memory controller is to:
    select a target logical band based on an invalidity count and an erase count, and relocate all valid key-value pairs from the target logical band to a current logical band and erase the target logical band; and recover one or more of a last opened logical band, a most recent indexing structure, or a most recent system level datastore.

12. At least one non-transitory computer readable storage medium comprising a set of instructions, which when executed by a processor, cause the processor to:

store in an indexing structure key data corresponding to a key of a key-value pair and an address for the key-value pair;

store in a datastore log separate from the indexing structure the key-value pair at the address in a logical band of a plurality of independent logical bands;

execute an operation involving the key-value pair;

populate a footer of at least one logical band of the plurality of independent logical bands with one or more of a status token or an error code;

populate a logical band header with a sequence number;

populate a logical band entry with data for a logical band entry header; and populate a logical band journal with a hash table entry when the indexing structure is a hash table.

13. The at least one non-transitory computer readable storage medium of claim 12, wherein the logical band entry header is to include a type field, a key length field, a value length field, the key-value pair, and an error code for the key-value pair.

14. The at least one non-transitory computer readable storage medium of claim 12, wherein the instructions, when executed, cause the processor to insert a current address for the key-value pair at the indexing structure.

15. The at least one non-transitory computer readable storage medium of claim 12, wherein the instructions, when executed, cause the processor to:

update an invalidity datastore with an invalidity count and with an erase count when the erase count is to be tracked;

update a logical band linked list with a clean logical band or a closed logical band and obtain a next clean logical band from the logical band linked list when needed; and update statistic information in a statistics datastore for a storage system.

16. The at least one non-transitory computer readable storage medium of claim 12, wherein the instructions, when executed, cause the processor to:

select a target logical band based on an invalidity count and an erase count, and relocate all valid key-value pairs from the target logical band to a current logical band and erase the target logical band; and recover one or more of a last opened logical band, a most recent indexing structure, or a most recent system level datastore.

17. A method comprising:

storing in an indexing structure key data corresponding to a key of a key-value pair and an address for the key-value pair;

storing in a datastore log separate from the indexing structure the key-value pair at the address in a logical band of a plurality of independent logical bands;

executing an operation involving the key-value pair;

populating a footer of at least one logical band of the plurality of independent logical bands with one or more of a status token or an error code;

populating a logical band header with a sequence number;

populating a logical band entry with data for a logical band entry header; and populating a logical band journal with a hash table entry when the indexing structure is a hash table.

18. The method of claim 17, wherein the logical band entry header is to include a type field, a key length field, a value length field, the key-value pair, and an error code for the key-value pair.

19. The method of claim 17, further including inserting a current address for the key-value pair at the indexing structure.

20. The method of claim 17, further including:

selecting a target logical band based on an invalidity count and an erase count, and relocating all valid key-value pairs from the target logical band to a current logical band and erase the target logical band; and recovering one or more of a last opened logical band, a most recent indexing structure, or a most recent system level datastore.

* * * * *